(12) United States Patent
Coriand et al.

(10) Patent No.: US 6,415,630 B1
(45) Date of Patent: Jul. 9, 2002

(54) METHOD AND DEVICE FOR PRODUCING A HOMOGENOUS SHEET OF QUARTZ GLASS WITHOUT STREAKS

(75) Inventors: Frank Coriand; Andreas Menzel, both of Jena (DE); Walter Nadrag, Bad Bleiberg (AT); Wolfgang Schmidt, Jena (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/403,887

(22) PCT Filed: May 15, 1998

(86) PCT No.: PCT/EP98/02887

§ 371 (c)(1),
(2), (4) Date: Jan. 11, 2000

(87) PCT Pub. No.: WO98/51630

PCT Pub. Date: Nov. 19, 1998

(30) Foreign Application Priority Data

May 15, 1997 (DE) .......................................... 197 20 259

(51) Int. Cl.[7] .................................................. C03B 5/08
(52) U.S. Cl. ..................... 65/57; 65/35; 65/90; 65/100; 65/109; 65/302; 65/108
(58) Field of Search ............................... 65/57, 35, 90, 65/100, 109, 108, 302

(56) References Cited

U.S. PATENT DOCUMENTS

| 2,382,187 A | 8/1945 | Vang | |
|---|---|---|---|
| 4,061,484 A | * 12/1977 | Aulich | |
| 4,612,023 A | * 9/1986 | Kreutzer | ........................ 65/90 |
| 5,443,607 A | * 8/1995 | Englisch | ........................ 65/64 |

FOREIGN PATENT DOCUMENTS

| DE | 3226451 | 1/1984 |
|---|---|---|
| DE | 4204406 | 8/1993 |
| WO | WO97/10184 | 3/1997 |

\* cited by examiner

*Primary Examiner*—James Derrington
(74) *Attorney, Agent, or Firm*—Jordan and Hamburg LLP

(57) ABSTRACT

In a method for producing a streak-free quartz glass sheet with a highly homogeneous degree of refraction, a quartz glass rod is lowered into a melting pot parallel to a longitudinal axis of the quartz glass rod. A cross-section of the melting pot is larger than a cross-section of the quartz glass rod and determines a contour of the quartz glass sheet. The quartz glass rod is heated in the melting pot to a flow temperature whereupon the quartz glass rod is lowered until the quartz glass rod melts and a height of the quartz glass flowing in the melting pot reaches a desired quartz glass sheet thickness. The melting pot and the quartz glass rod move relative to each other in a direction which is perpendicular to the longitudinal axis of the quartz glass rod during the melting process. Preferably, the movement involves a rotational and a transverse movement.

9 Claims, 1 Drawing Sheet

METHOD AND DEVICE FOR PRODUCING A HOMOGENOUS SHEET OF QUARTZ GLASS WITHOUT STREAKS

BACKGROUND OF THE INVENTION

The invention relates to a method and a device for producing a homogeneous sheet of quartz glass without streaks.

The absence of bubbles, the absence of streaks and homogeneity with respect to the refractive index are important when producing quartz glass plates. In this connection, a method and a device were disclosed in the DE 32 26 451 C2, for which the free end of a freely suspended solid quartz glass cylinder protrudes into a vessel, in an atmosphere of inert gas, and into a graphite melting pot in the vessel. The solid quartz glass cylinder is heated in the vessel to its flow temperature. After it reaches its flow temperature, it is lowered to the bottom of the graphite melting pot and advanced in order to melt it. Aside from the fact that considerable technological effort is required for this purpose, the suspension is less stable and the yield of quartz glass with small changes in refractive index is very limited. Moreover, the remainder of the solid quartz glass cylinder can be removed only after the device has cooled down. This is associated with great expense and glass loss.

It is therefore an object of the invention to provide a method and a device, which function technologically with little effort and make improved quality characteristics possible, especially with respect to the homogeneity of the refractive index over a large portion of the quartz glass plate.

SUMMARY OF THE INVENTION

Pursuant to the invention, this objective is accomplished by providing a quartz glass body which is cylindrical preferably and optically free of streaks at least in the longitudinal direction, as a blank with a relatively small cross section. The blank is transformed into a sheet of almost any configuration and extent, which has a relatively large homogeneous region and is determined only by the geometry of a melting pot, consisting advantageously of graphite, which is a graphite mold. At the same time, the relative movement between the quartz glass object and the melting pot, which is directed transversely to the longitudinal axis of the quartz glass rod, preferably is a rotational movement about an axis directed essentially parallel to the above-mentioned longitudinal axis. The relative movement in the present invention can thus be composed of a single transverse shifting and a constant rotational movement. For carrying out the relative movement between the quartz glass rod and the melting pot, only the quartz glass rod or the melting pot advantageously is moved. Advantageously, the quartz glass rod is introduced eccentrically into the melting pot, so that its longitudinal axis does not pass through the center of the melting pot or, in the event that the melting pot is cylindrical in shape, is offset essentially parallel to the cylindrical axis of the melting pot. The eccentricity then advantageously is equal to the radius of the quartz glass rod, which is also constructed as a cylinder. For melting the quartz glass rod, the latter is not lowered to the bottom of the melting pot, but kept at a certain distance from the bottom, so that there is nothing to impede the melting heat reaching a free end of the quartz glass rod in the melting pot from all sides. In the course of the melting, the quartz glass rod is advanced at a suitable and optionally adjustable rate. When the quartz glass plate attains the desired thickness, the advance of the quartz glass rod is suspended. The flow temperature is still retained for a certain time, the quartz glass rod is moved away from the quartz plate, and at the same time, melted off from its holding device. Heating is subsequently suspended. Advantageously, the melting-off site is flushed with inert gas. The whole process can take place automatically.

For the manufacturing process, it is an advantage if the quartz glass rod and the melting pot are constructed cylindrically. The quartz glass rod is connected to an arm over a constriction and an interposed holding piece. The melting off at the end of the melting process for producing the plate advantageously takes place at the constriction. For adjusting the eccentricity, the arm advantageously is constructed telescopically. In order to carry out the relative movement of the quartz glass rod relative to the melting pot, either the quartz glass rod can be mounted on the arm or preferably the melting pot can be mounted in a furnace housing or both can be mounted rotatably. If the melting pot is in the furnace housing, then the latter advantageously is provided at its inside with heating elements in a suitable arrangement. For introducing the quartz glass rod into the melting pot, the furnace housing and the heating space are provided with lead-throughs, of which at least the lead-through in the furnace housing is equipped so that it can be flushed with an inert gas.

The method of the present invention is characterized by the following steps. The preferably cylindrical quartz glass column or quartz glass rod is transformed thermally in a graphite mold heated in a heatable furnace housing. For this purpose, the lower end of the quartz glass rod, guided by means of a holding device, is lowered up to a certain distance above the bottom of the graphite mold in the furnace. This distance can be 5 to 20 mm and serves for heating uniformly as well as for ensuring a certain safety. By being heated to its flow temperature, the quartz glass rod melts off under the action of its own weight and flows onto the bottom of the mold. While continuing the heating, the quartz glass rod is lowered further at a defined rate up to a pre-selected height mark, which fixes the lower edge of a melting-off position. After this height mark is reached, the remaining quartz glass rod is held in this position for a certain time, before it is pulled out of the furnace at a defined rate while simultaneously melting off. At the same time, no melt is pulled out of the melting pot. After the melting off commences, there is a relative rotary and/or translatory movement between the quartz glass rod and the graphite mold at right angles to the direction, in which the quartz glass rod is lowered, preferably at a rate of 0.1 to 3 revolutions per minute. At the same time, the geometric axes of the quartz glass rod and the graphite mold can preferably be offset mutually by the radius of the quartz glass rod. By means of this measure, which also ensures that the interior glass and the surface glass of the quartz glass rod are not mixed with one another, the quartz glass plate, being formed in the graphite melting pot, has more advantageous homogeneity relationships than does the starting glass rod. That is, the cross-sectional region of defined good quality is relatively larger in the molten quartz glass plate that in the total cross section, relative to the total cross section of the quartz glass rod. Taking into consideration a height marking, a melting-off site has been incorporated in the quartz glass rod in the form of a constriction or a welded-in intermediate piece, up to which the quartz glass of the rod is used for the production of the quartz glass plate in the graphite melting pot. A further lowering of the quartz glass rod then does not take place. It is advantageous to flush not only the interior of the furnace with inert gas, but also the inlet opening to the furnace for the quartz glass rod and, with that, the quartz glass rod or the holding rod for the quartz glass rod at this site. The quartz glass rod consists of a material of high quality or of a quality adequate for the quartz glass plate, which is to be produced. The holding rod or the corresponding holding elements, preferably welded to the quartz glass rod, consist of materials of a quality, which can be lower that of the quartz glass rod.

BRIEF DESCRIPTION OF THE DRAWINGS

The invention is described in greater detail by means of the diagrammatic drawing of an embodiment, in which.

DETAILED DESCRIPTION OF THE INVENTION

Figure 1:
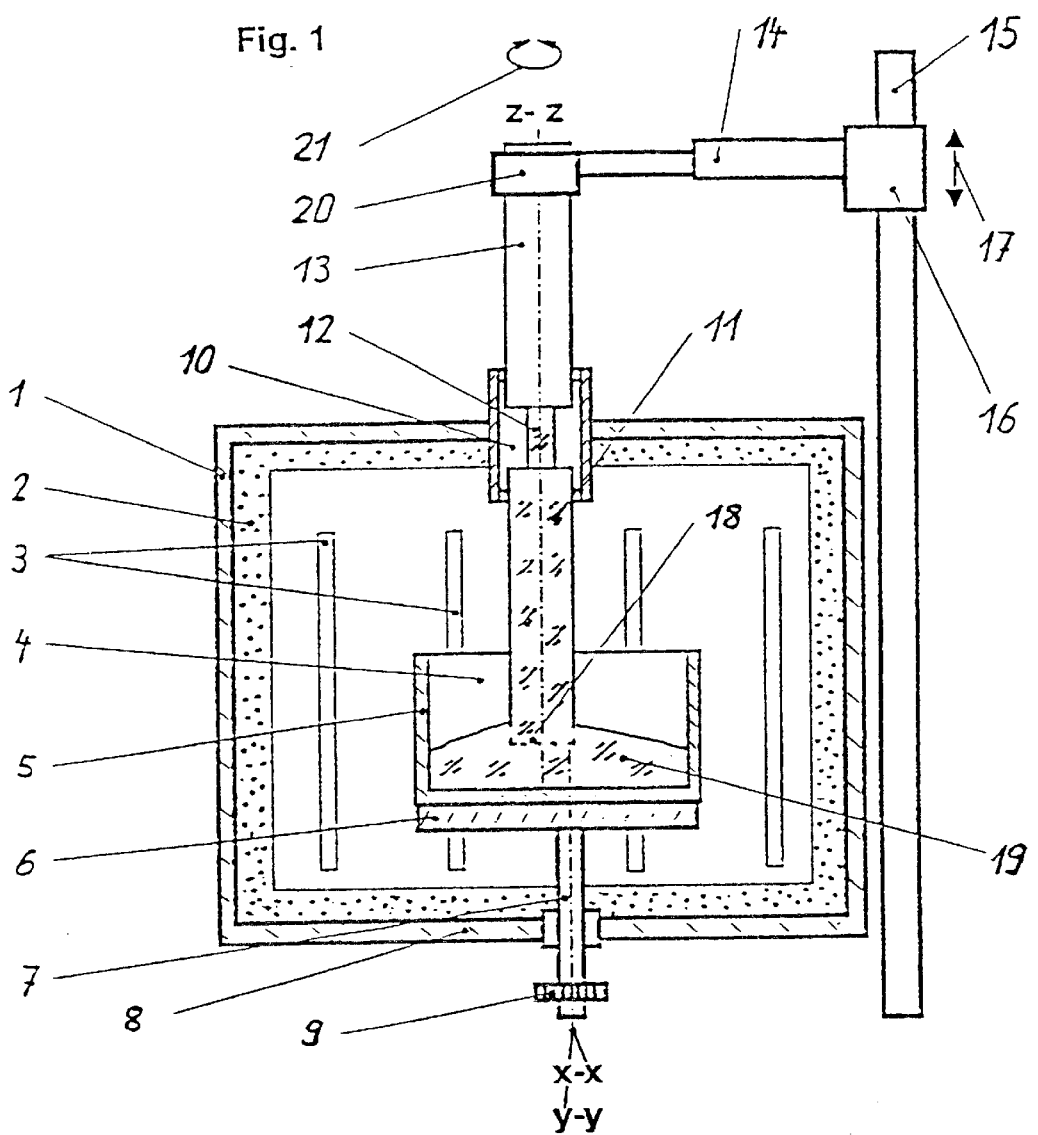
FIG. 1 shows a vertical section of an device of the present invention.

In FIG. 1, in a furnace housing 1 with an internal insulation 2 are heating elements 3, disposed and distributed over the circumference of the insulation at a distance from the internal insulation 2 and from one another. A graphite melting pot 4, the side wall 5 of which is constructed cylindrically, is rigidly fixed eccentrically on a base plate 6. The base plate 6 is fastened to the upper end of a shaft 7, which is mounted in the bottom 8 of the furnace housing 1 so that it can be rotated about an X—X axis, which is directed parallel to the Y—Y axis of the melting pot and, in the present case, coincides with the Y—Y axis. The rotation of the shaft 7 is brought about by a driving device, which is located outside of the furnace housing 1. A gear wheel 9, which is firmly wedged with the shaft 7, can be seen. In the upper part of the furnace housing 1, a lead-through 10 for a quartz glass rod 11 is provided, the lower end of which protrudes into a graphite melting pot 4 and the other end of which adjoins a tapered piece 12, which in turn is firmly connected with a holding piece 13. The holding piece 13 is fastened to a telescopic arm 14, which is provided on a slide 16, which can be adjusted along guide 15 parallel to the X—X and Y—Y axes and essentially at right angles to the guide 15. Between the slide 16 and the one end of the telescopic arm 14, there is a rigid connection. On the other hand, the holding piece 13 at the other end of the telescopic arm 14 is mounted so that it can be rotated about a Z—Z axis, which is directed essentially parallel to the direction of motion of the slide 16, which is indicated by a double arrow 17. The rotation of the holding piece 13 in the direction of a double arrow 21 is provided by a rotating device 20, which is provided at the telescopic arm 14. Optionally, the holding piece 13 and the telescopic arm 14 are connected in such a way, that the quartz glass rod 11 sits on the holding piece 13 only due to the weight of the quartz glass rod 11. As a result, in the event of possible obstructions to the downwards movement of the slide 16, the slide 16 optionally remains in position or, in conjunction with a possibility for controlling the melting, the downward movement of the slide can be retarded. All of the axes named, X—X, Y—Y and Z—Z, are directed parallel to one another and, in FIG. 1, parallel to the plane of FIG. 1. The distance between the X—X and Z—Z axes shall be approximately equal to the radius or half the outline side length of the quartz glass rod 11.

Before the start of the melting off process shown in FIG. 1, the lower end of the quartz glass rod 11, which is drawn by a broken line and labeled 18, is at a distance from the bottom of the graphite melting pot 4. The heating elements 3 are activated, the end of the quartz glass rod 11, protruding into the graphite melting pot 4, is heated to the flow temperature and the lower end 18 of the quartz glass rod 11 is left in the position shown until the quartz glass of the end 18 flows onto the bottom of the graphite melting pot 4. With a first coverage of the bottom of the graphite melting pot, the graphite melting pot 4 is caused to rotate about the X—X axis and, optionally the quartz glass rod 11 is rotated about the Z—Z axis. The slide 16 is moved downward in the direction of the double arrow 17 in proportion to the melting of the quartz glass rod 11 and the quartz glass rod 11 is moved into the graphite melting pot 4 until a quartz glass plate 19, formed in the graphite melting pot 4, has the desired thickness, which develops uniformly later in the process. Subsequently, although the flow temperature initially is retained, the quartz glass rod 11 no longer is advanced vertically. After a certain time (5 to 60 minutes), the slide 16 is moved upward in the direction of the double arrow 17, the rotation of the melting pot 4 about the X—X axis is suspended and, at the same time, the quartz glass rod 11 is melted off. The rate of movement upward of the slide is such, that none of the quartz glass, already molten off, is pulled up. After the melting, the heating is switched off or controlled so that the quartz glass plate 19 can cool off in the graphite melting pot 4.

Figure 2:
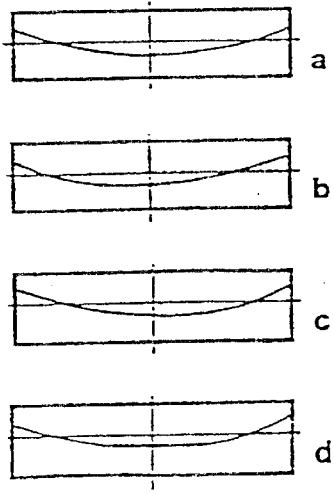
FIG. 2 shows the total refractive index homogeneity variation as a function of the eccentricity and rotation of a quartz glass rod.

In diagrams a to d of FIG. 2, the total refractive index homogeneity variation of the finished quartz glass plate 19 in the graphite melting pot 4 is shown as a function of the eccentricity of the quartz glass rod 11 relative to the graphite melting pot 4 and of the distance between the X—X and Z—Z axes. There is no eccentricity in diagram a. The region of small refractive index changes is limited to a small central region. In diagram b, the region of small refractive index changes, corresponding to the Z—Z axis, is shifted to the left relative to the X—X axis and runs out to the right. In diagram c, the region of small refractive index changes is shifted to the right and runs out flat to the left. The diagram d finally illustrates the effect of the eccentric and rotary introduction of the melting composition into the melting pot 4. A clear increase in the region of low refractive index changes is attained.

Basically, by rotating the quartz glass rod 11, disposed coaxially with the melting pot 4, the central region is not enlarged; however, the refractive index homogeneity in the central region is improved. If the Z—Z axis of the quartz glass rod 11 is shifted, so that it no longer coincides with the center or the Y—Y axis of the melting pot 4, the region of improvement of the refractive index homogeneity is enlarged even more. This can also be achieved owing to the fact that the X—X and Z—Z axes are held so as to coincide with one another and the melting pot 4 is shifted laterally on the base plate 6, so that the Y—Y geometric axis of the melting pot does not coincide with either of the two axes, X—X and Z—Z.

In other variations of the embodiments, none of the axes X—X, Y—Y and Z—Z coincides with the other. The relative movement between the graphite melting pot 4 and the quartz glass rod 11 are optionally by rotating the quartz glass rod about its Z—Z axis, by rotating the graphite melting pot about the Z—Z axis of the quartz rod, by rotating the graphite melting pot about its own X—X axis, and by the translational movement between the graphite melting pot and the quartz glass rod individually and in combination with one another. Any of the above-listed movements can take place individually and in combination with one another. The furnace atmosphere may consist of an inert or a noble gas. If the furnace housing 1 is sealed appropriately, it is also possible to produce a vacuum. The furnace housing 1 can be heated by radiation or induction. Especially in the latter case, a separate heating space 3 with external insulation is important. The lead-through 10, at least where it faces the graphite melting pot 4, can also be provided with an additional heater.

Aside from improving the macroscopic homogeneity, the relative movement of melting pot 4 and quartz glass rod 11 results in an improvement in the microscopic homogeneity, especially in the local homogeneity gradients, as a result of the shift of individual volume elements and their mutual arrangement relative to their position in the starting quartz glass rod.

What is claimed is:

1. A method for producing a homogeneous streak-free quartz glass plate comprising the steps of:

lowering a solid quartz glass rod parallel to a longitudinal axis Z—Z of the quartz glass rod into a melting pot wherein a cross section of the melting pot is larger than a cross section of the quartz glass rod and a contour of the melting pot determines a contour of the quartz glass plate;

heating the quartz glass rod to a flow temperature of the quartz glass rod in the melting pot and continuing heating of the quartz glass rod during lowering while the quartz glass rod is melted off until a level of quartz glass flowing in the melting pot corresponds to a desired thickness of the quartz glass plate; and conducting relative movement between the quartz glass rod and the melting pot in a direction transverse to the longitudinal axis Z—Z, during forming of the quartz glass plate.

2. The method of claim 1, wherein the melting pot has a bottom, and the step of conducting relative movement between the quartz glass rod and the melting pot commences as soon as the quartz glass melted from the quartz glass rod, covers the bottom of the melting pot.

3. (Amended) The method of claim 1, wherein the relative movement is a rotational movement about an X—X axis directed essentially parallel to the longitudinal axis Z—Z.

4. The method of claim 1, wherein the quartz glass rod is introduced essentially eccentrically into the melting pot.

5. The method of claim 1, wherein the quartz glass rod is in the form of a cylinder and is introduced into the melting pot at a distance from a center of the melting pot, corresponding to a radius of the cylinder.

6. The method of any one of claim 1, 3, 4 or 5, wherein the melting pot has a bottom and the melting of the quartz glass rod commences at a finite distance from an inner surface of the bottom of the melting pot.

7. The method of any one of claims 1 to 5, further comprising the steps of:

suspending the lowering of the quartz glass rod and the conducting of relative movement between the quartz glass rod and the melting pot directed transversely to the longitudinal axis Z—Z after the desired thickness is achieved;

retaining the flow temperature for a period of time while moving the quartz glass rod away from the quartz glass plate and melting off the quartz glass rod; and subsequently suspending the heating of the quartz glass rod.

8. The method of claim 7 wherein the moving of the quartz glass rod away from the quartz glass plate is conducted such that none of the quartz glass which is melted off the quartz glass rod is pulled up.

9. The method of claim 2 wherein the melting of the quartz glass rod commences at a finite distance from an inner surface of the bottom of the melting pot.

* * * * *